United States Patent [19]
Enokido et al.

[11] Patent Number: 5,638,414
[45] Date of Patent: Jun. 10, 1997

[54] METHOD FOR DETECTING FAILURE OF NUCLEAR REACTOR FUEL

[75] Inventors: Yuji Enokido; Kuniaki Ara; Hiroshi Hiroi, all of Tsuruga, Japan

[73] Assignee: Doryokuro Kakunenryo Kaihatsu Jigyodan, Tokyo, Japan

[21] Appl. No.: 631,128

[22] Filed: Apr. 12, 1996

Related U.S. Application Data

[63] Continuation of Ser. No. 451,414, May 26, 1995, abandoned.

Foreign Application Priority Data

May 27, 1994 [JP] Japan .................................. 6-115143

[51] Int. Cl.$^6$ ........................................... G21C 17/00
[52] U.S. Cl. .................... 376/251; 376/250; 376/253; 376/153
[58] Field of Search ........................ 376/251, 250, 376/253, 153; 250/361 R, 336; 976/DIG. 209, DIG. 218, DIG. 227, DIG. 232; 378/6, 11, 25, 4

[56] References Cited

U.S. PATENT DOCUMENTS

| | | | |
|---|---|---|---|
| 3,929,570 | 12/1975 | Jones et al. | 376/450 |
| 4,110,620 | 8/1978 | Womack | 250/361 R |
| 4,870,669 | 9/1989 | Anghale et al. | 378/87 |
| 4,968,475 | 11/1990 | Drukier et al. | 376/153 |
| 5,414,742 | 5/1995 | Hornak et al. | 376/251 |

Primary Examiner—Charles T. Jordan
Assistant Examiner—Meena Chelliah
Attorney, Agent, or Firm—Armstrong Westerman Hattori McLeland & Naughton

[57] ABSTRACT

The present invention provides a method for identifying failed fuel elements and the scale of damage accurately, quickly and at low cost without disassembling a fuel assembly and without discharging radioactive waste. Radiation detector(s) for measurement of gamma radiation emitted from surface of the irradiated fuel assembly and the fuel assembly are rotated and translated relative to each other, the dectected data of the radiation emitted from the surface of the fuel assembly is acquired, processed, a tomographic image is constructed from the radiation intensity distribution and is prepared and displayed, and a failed fuel element is finally confirmed from the tomographic image of the fuel assembly cross-section.

2 Claims, 4 Drawing Sheets

Cross-section A-A

ECT by fission product gas nuclide

ECT by total γ radiation

Positions of failed fuel elements

METHOD FOR DETECTING FAILURE OF NUCLEAR REACTOR FUEL

This application is a continuation of application Ser. No. 08/451,414 filed May 26, 1995, now abandoned.

BACKGROUND OF THE INVENTION

The present invention relates to a method for detecting the failure of nuclear reactor fuel. It is generally available for the detection of fuel failure, providing confirmation as to whether a fuel assembly used in a nuclear fission reactor ("nuclear reactor") is failed or not and, if failed, capable of identifying failed fuel element and the scale of the failure. The invention relates in particular to a method for detecting the failure of a nuclear reactor fuel by means of emission computer tomography (ECT) utilising the radioactivity of the fuel itself. The method is available not only for fuel assemblies in fast reactors, light water reactors, heavy water reactors and other nuclear reactors but can also be extensively used for inspection to identify sources of failure.

A method for identifying the failure of a nuclear reactor fuel assembly comprises the following steps: (1) to collect information on the occurrence of failure in a nuclear reactor; (2) to identify the approximate location of the failure in the reactor core; and (3) to identify failed fuel assemblies.

(1) Collection of information on the occurrence of failure in a nuclear reactor (a) CG method (cover gas method)

In a fast reactor, liquid sodium is used as a coolant and argon gas fills the space above the liquid sodium as a cover gas. When a fuel assembly fails, fission product (F.P) gas is released, and this will be contained in the cover gas. Therefore, it is possible to detect failure of the fuel assembly by sampling the cover gas and finding out whether the F.P gas is present in the cover gas or not.

(b) DN method (delayed neutron method)

When a fuel assembly fails, nuclides such as iodine, bromine, etc., which emit delayed neutrons, migrate into the liquid sodium. Thus, it is possible to detect failure of the fuel assembly by sampling the sodium with nuclides which delayed neutrons emit.

(2) Identification of the approximate position of a failed assembly in a reactor core (a) FLT method (flux tilting method)

A fast reactor is operated by passing a primary system coolant in a plurality of loops. When a fuel assembly fails somewhere in the reactor core, nuclides which emit neutrons reach the primary system loop. In this case, there is a difference in the duration of time taken to reach the loop which depends upon the location of the failed assembly in the core. Therefore, it is possible to identify approximately in which zone the failure has occurred by sampling the liquid sodium in each loop and finding out the time difference for the neutrons to reach the loop.

(b) S/V method (selector valve method)

A plurality of ducts for sampling are provided in a nuclear reactor, and by sampling liquid sodium from each of the ducts by means of a pump, it is possible to identify approximately where the fuel failure has occurred.

(3) Method to identify a failed fuel assembly (a) TG method (tag gas method)

Different types of special gas are placed in each of the fuel assemblies, and so, by detecting the gas coming out of a failed fuel assembly, it is possible to detect in which fuel assembly the failure has occurred.

(b) Sipping method

A cap is placed on the head of each fuel assembly through which liquid sodium is sipped by means of a pump, and it is possible to identify a failed fuel assembly by finding out whether the F.P gas is contained or not.

By the methods (1)–(3) described above, the failed fuel assembly can be ultimately identified. To identify further in which fuel element in the fuel assembly the failure has occurred, it has been the practice in the past to disassemble each fuel assembly and to perform post-irradiation tests on each of the fuel elements.

Since this must be carried out for each of the fuel elements, it is a very inefficient method and much time and labor are required before the failure is finally confirmed.

SUMMARY OF THE INVENTION

The present invention is proposed to solve the above problems.

It is an object of the present invention to provide a method by which it is possible to identify a failed fuel element without disassembling a fuel assembly.

It is another object of the present invention to provide a method by which it is possible to identify failed fuel elements and so find out the scale of the damage in terms of the number of the failed fuel elements.

It is another object of the invention to identify failed fuel elements and the scale of the damage accurately and quickly.

It is another object of the invention to detect failed fuel at low cost.

It is still another object of the present invention to detect fuel failure without discharging radioactive waste.

The method for detecting failure of nuclear reactor fuel which is the subject of the present invention attains the above objects. It is characterised by the relative rotation and translation of the fuel assembly and a detection of the gamma radiation it emits. The detector data is acquired and processed to construct and display a tomographic image of the radiation intensity distribution over the cross section of the fuel assembly. Failed fuel elements are detected by variations in the radiation intensity in the tomographic image.

Alternatively, the detector is placed opposite to the gas plenum of fuel elements in a reactor fuel assembly and the radiation emitted by the FP gas nuclides is detected.

In the present invention, a tomographic image of radiation intensity distribution for a fuel assembly is obtained by the ECT method using the radioactivity of the fuel itself as the radiation source to identify the position of the failed fuel element in the fuel assembly. Accordingly, there is no need to disassemble the fuel assembly as in the past and to perform post-irradiation tests on each of the fuel elements. Because the failed fuel element can be found and the scale of the damage can be identified without disassembling the fuel assembly, it is possible to detect the damage accurately, quickly and economically without discharging radioactive waste.

DETAILED DESCRIPTION OF THE PREFERRED EMBODIMENT

In the following, description will be given of an embodiment of the present invention in connection with the drawings.

Figure 1A:
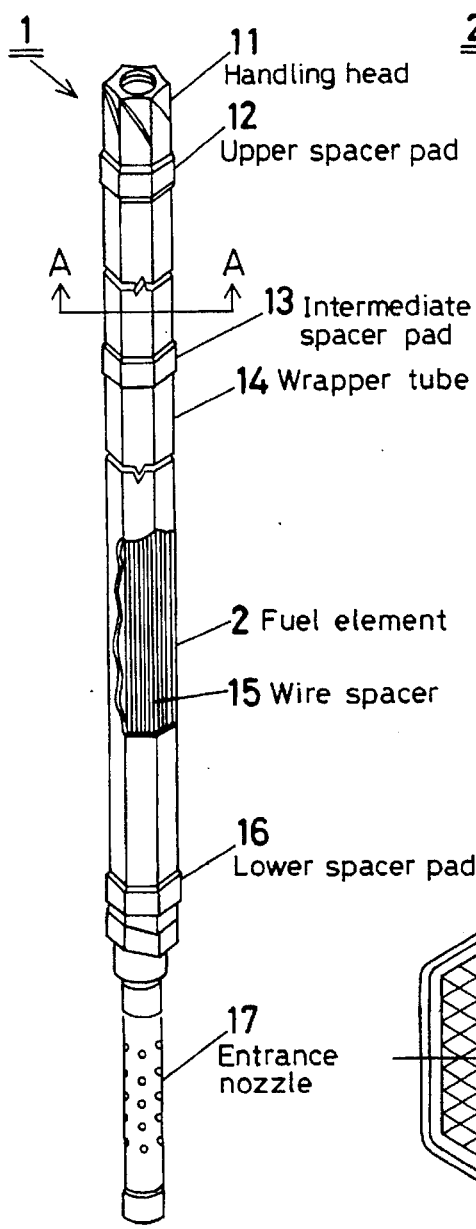
FIG. 1 represents the structure of a fuel assembly for a basic type fast reactor.
Figure 1B:
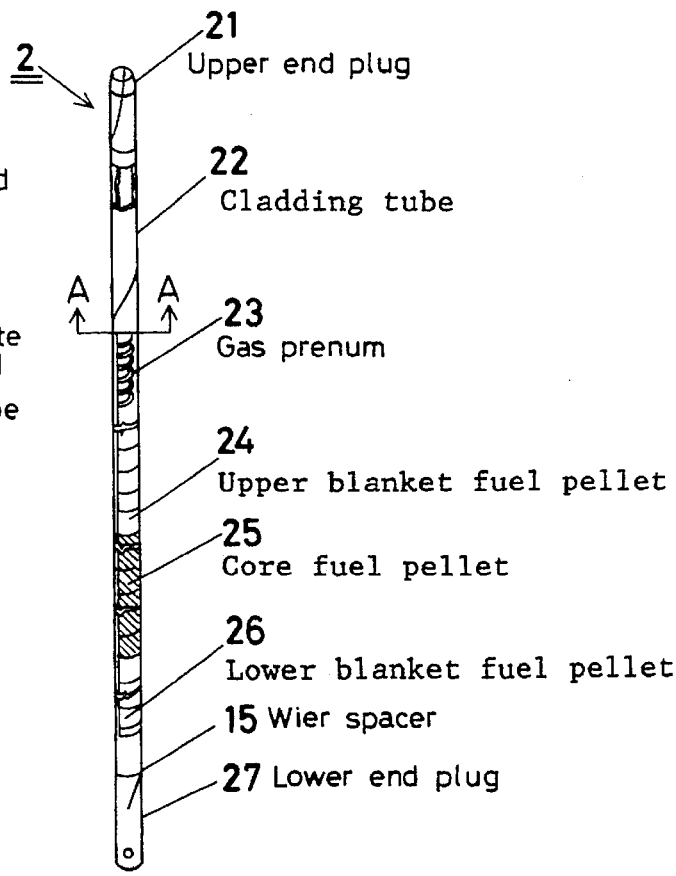
Figure 1C:
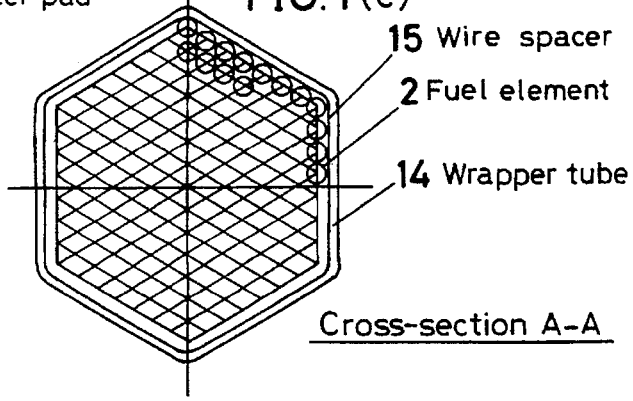

FIG. 1 represents the structure of a fuel assembly for a basic type fast reactor. FIG. 1 (a) is a general bird's-eye view of a fuel assembly, FIG. 1 (b) shows the fuel assembly, and FIG. 1 (c) is a cross-sectional view of the fuel assembly. In these figures, reference numeral (1) represents a fuel assembly, (11) represents a handling head, (12) an upper spacer pad, (13) an intermediate spacer pad, (14) a wrapper tube, (15) a wire spacer, (16) a lower spacer pad, (17) an entrance nozzle, (2) a fuel element, (21) an upper end plug, (22) a cladding tube, (23) a gas plenum, (24) an upper blanket fuel pellet, (25) a core fuel pellet, (26) a lower blanket fuel pellet, and (27) a lower end plug.

In the fuel assembly (1), wrapping wires in spiral shape wound on fuel element (2) that closely fitted adjacent fuel elements are not brought into contact with each other. The upper end of the fuel assembly is the handling head (11) for suspending the fuel assembly. Each of the upper spacer pad (12), the intermediate spacer pad (13), and the lower spacer pad (16) is designed larger than that of the wrapper tube to prevent the wrapper tubes from being in contact with each other in the reactor. On the lower portion of the fuel assembly the entrance nozzle (17) is provided for the liquid sodium coolant.

In the fuel element the upper blanket fuel pellet (24), the core fuel pellet (25) and the lower blanket fuel pellet (26) fill the cladding tube (22) as shown in FIG. 1 (b). The gas plenum (23) for accommodating the released fission products is provided above the upper blanket fuel pellet (24). Upper and lower ends are closed with the end plugs (21) and (27), and ends of the wire spacer (15) are welded to these end plugs.

In general, fission products are accumulated in a burnt fuel element and most of them are radioactive substances, mainly radiating gamma rays. These radioactive substances collect in the gas plenum (23) as fissioned gas. This F.P gas can be utilized as a nuclide, which offers information on failure of the fuel element. Specifically, when the fuel element fails the F.P gas accumulated in the gas plenum (23) is released. As a result, the failed fuel element has a lower radiation intensity than a normal fuel element. In particular, such a difference in the radiation intensity becomes extremely marked at the gas plenum where the F.P gas is accumulated. Accordingly, it is possible to identify the failure by determining major nuclides in the F.P gas in the gas plenum, i.e. krypton (Kr), xenon (Xe) or iodine (I).

The present invention is based on these findings. By obtaining a tomographic image of intensity distribution of the radiation emitted from the nuclides, using the ECT method, it is possible to identify the position of a failed fuel element, which may be present in the fuel assembly, and to display it on a cross-section of the fuel assembly. Unlike the methods used in the past, the failure can be detected quickly, accurately and economically without disassembling the fuel assembly.

Figure 2:
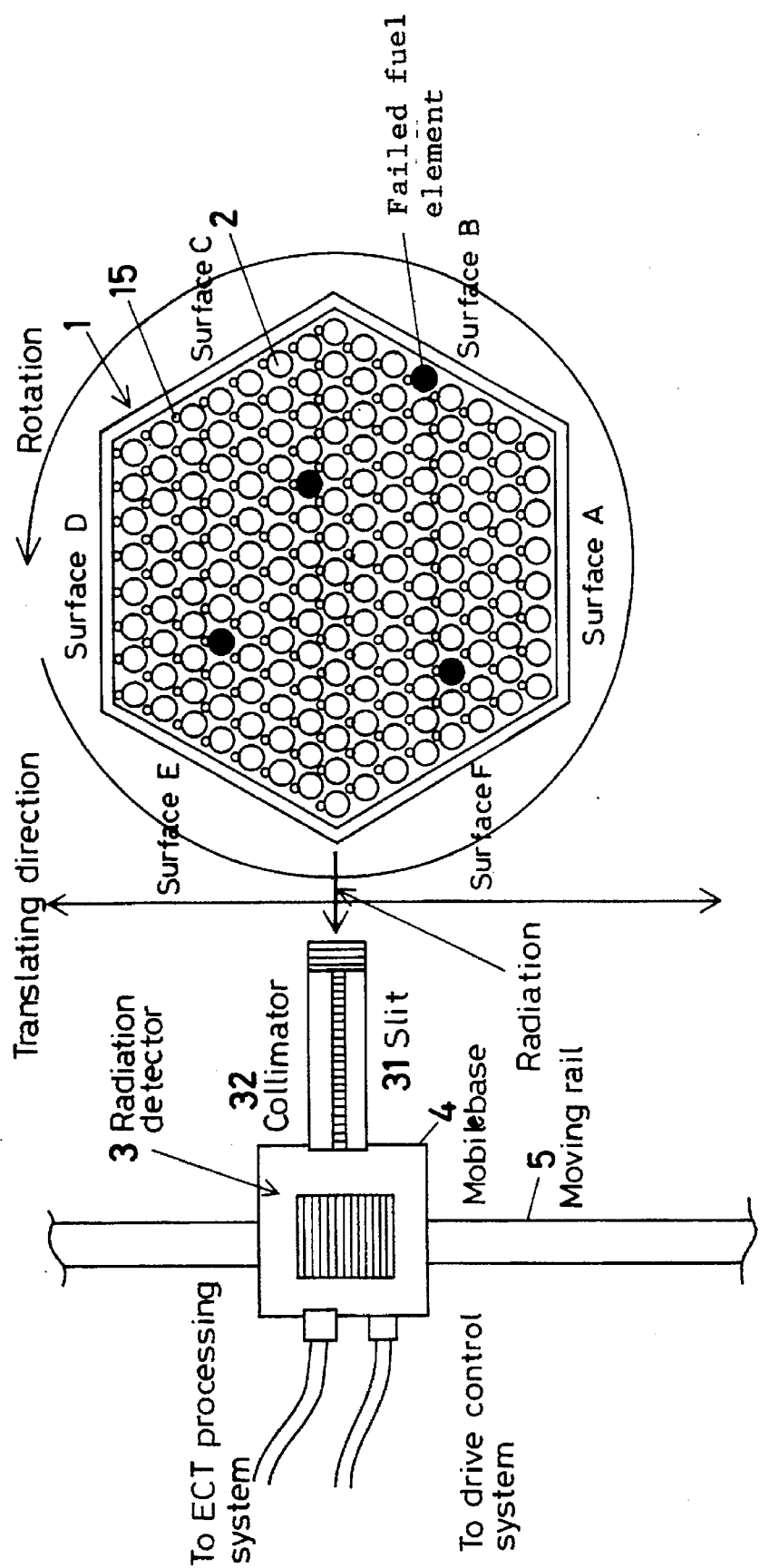
FIG. 2 explains the method for detecting a failed fuel element according to the present invention.
Figure 3:
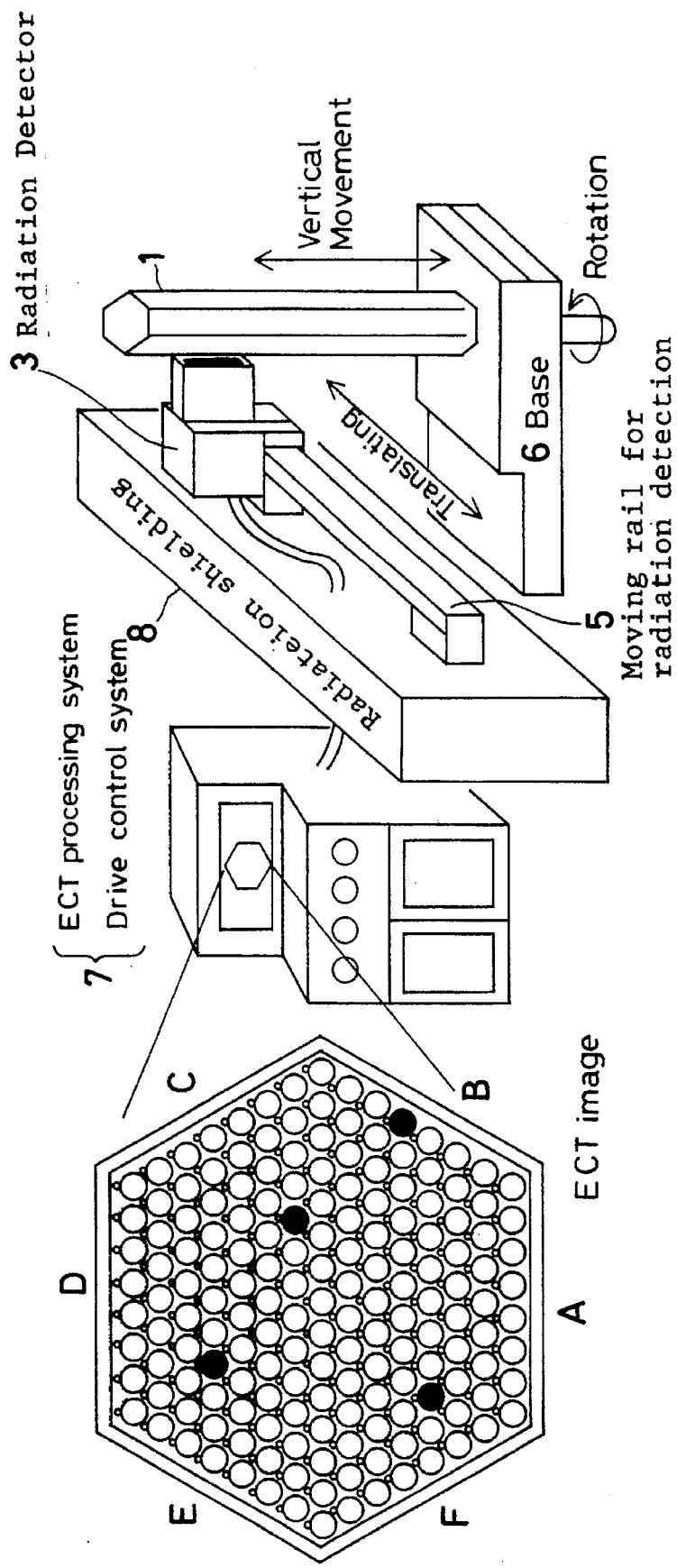
FIG. 3 represents a general configuration of a radiation detecting system.
Figure 4C:
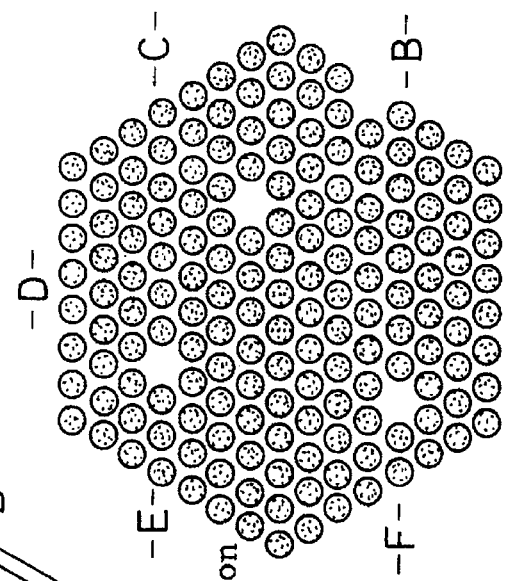
FIG. 4 represents the positions of the failed fuel elements as detected by the method of the present invention.
Figure 4B:
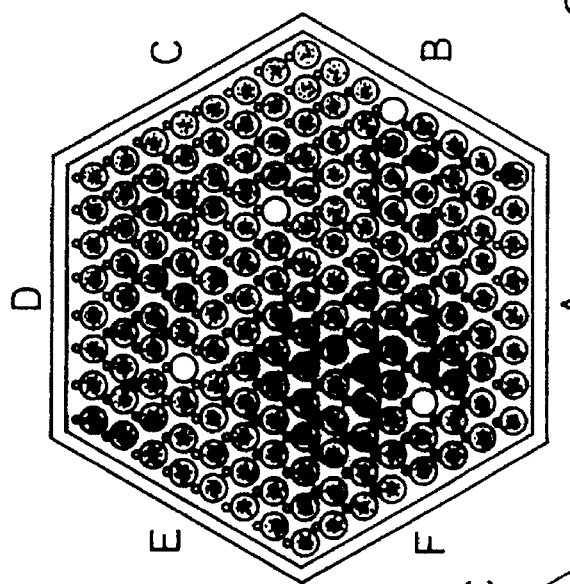
Figure 4A:
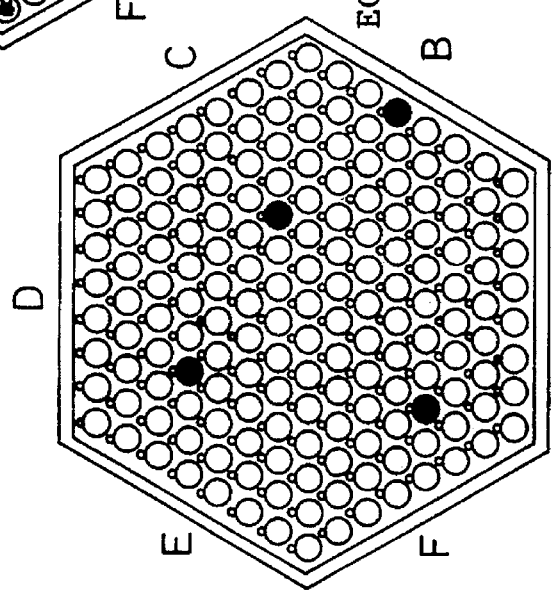

FIG. 2 shows a method for the identification of failed fuel elements according to the present invention. FIG. 3 represents a general configuration of a detecting system, and FIG. 4 represents positions of failed fuel elements detected by the method of the present invention.

Explaining the arrangement of the detecting system referring to FIG. 3, a fuel assembly (1) is supported on a base (6) and is movable in the vertical direction and is also rotatable. A radiation detector 3 is provided which moves along a rail on a mobile base (4) and detects radiation from the fuel assembly (1). The radiation detector is driven and controlled by an ECT processing and drive control system (7) at a position shielded by a radiation shielding member (8). Thus, a CT image can be obtained.

In FIG. 2, the fuel assembly (1) is moved in the vertical direction, and the gas plenum is set, for example, to a position where radiation can be detected by the radiation detector. The radiation detector (3) scans, with a predetermined spacing, a plane perpendicular to the axial direction of the fuel assembly, and radiation from a given direction is detected by a collimator (32) via a slit (31). The fuel assembly is rotated by one turn around the axis with given angular movements for each translated position of the radiation detector. Based on the radiation intensity data thus obtained, a tomographic image of radiation intensity distribution is obtained by means of the ECT processing and drive control system (7).

Although the fuel assembly is rotated in the above, it is needless to say that the radiation detecter may be rotated instead.

In FIG. 4 (a), there are four failed fuel elements marked with black circles in a fuel assembly. Some radiation from the gas plenum is from an activated nuclide in the 316 stainless steel used as the material for the wrapper tube and the fuel element. In the tomographic image of total radiation, only the outline of the fuel element from which the F.P gas has been released is displayed. In contrast, in a tomographic image using the F.P gas nuclide, only the information on the position of the gas plenum is given. Thus, radiation intensity is lower in the portion of the fuel element, from which F.P gas has been discharged, and the portion of the fuel element is displayed as an empty space as shown in FIG. 4 (c). As shown in FIGS. 4 (b) or (c), it is possible according to the present invention to use either of the tomographic images.

As explained above, the high intensity fission products of the spent fuel element itself are used as the radiation source in the present invention, and the position of the radiation source is defined within the fuel element. As a result, the failed fuel element can be detected efficiently and accurately using emission computer tomography. This makes it possible to overcome inefficiency in the conventional method for identifying the failed fuel element in a fuel assembly, to provide timely action for operation and control of reactor core and to improve efficiency in nuclear reactor operation.

What we claim are:

1. A method for detecting failure of a nuclear reactor fuel comprising the steps of:

(a) identifying one or more failed fuel assemblies; and (b) identifying one or more failed fuel elements in each identified failed fuel assembly, including the substeps of (b1) detecting gamma radiation emitted by the identified fuel assembly with a gamma radiation detector and acquiring detector data, while relatively rotating and translating the identified fuel assembly about the gamma radiation detector, (b2) constructing a tomographic image of the radiation intensity distribution over a cross section of the identified fuel assembly based upon the detector data, and (b3) determining said one or more failed fuel elements by variations in the radiation intensity in the tomographic image.

2. A method for detecting failure in fuel for a nuclear reactor according to claim 1, wherein the radiation detector is placed opposite to a gas plenum of the fuel element of the fuel assembly, and radiation emitted from fission product nuclides in the gas plenum is detected.

\* \* \* \* \*